A. BOX.
RADIAL DRILLING MACHINES.
No. 184,060. Patented Nov. 7, 1876.
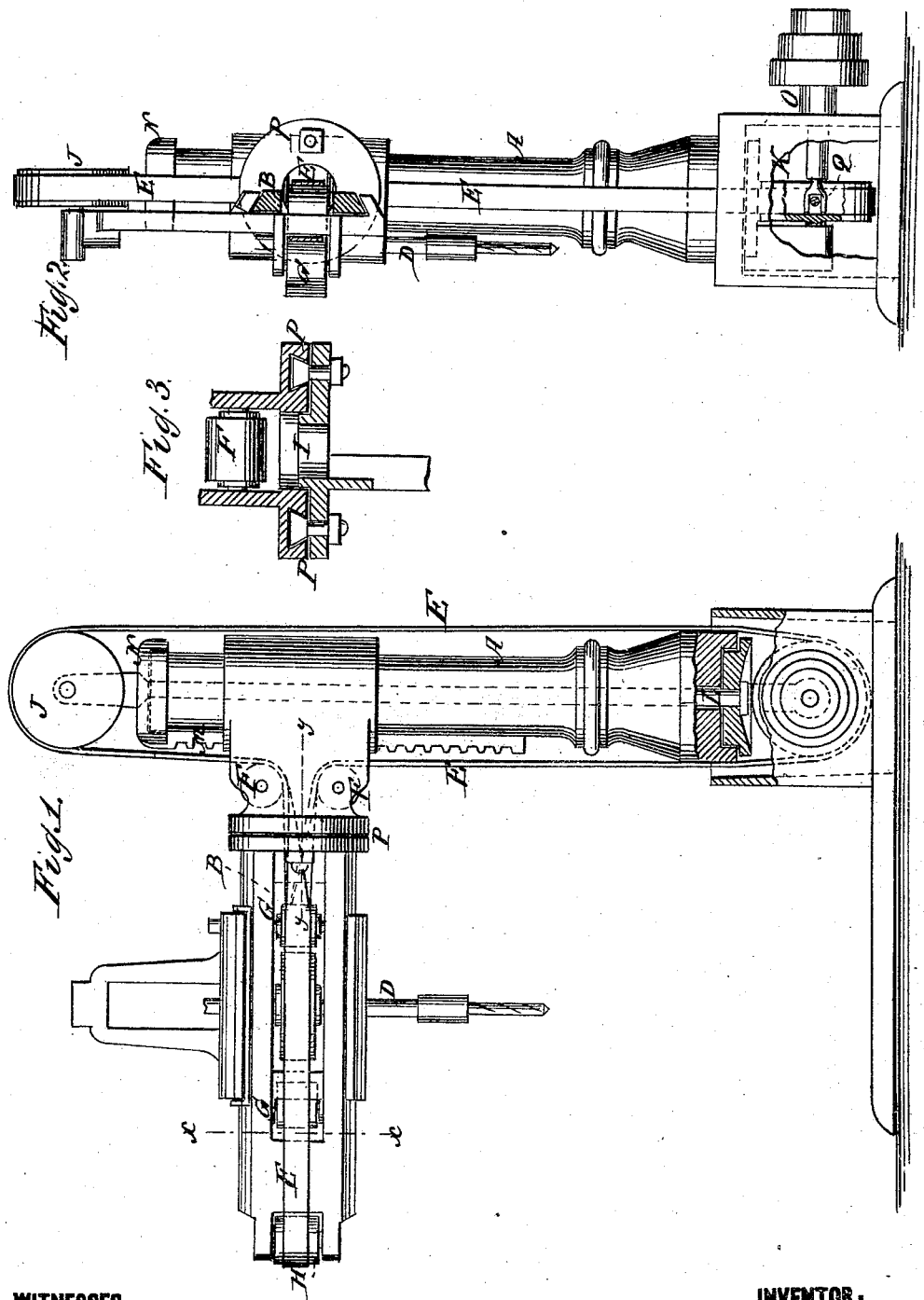

UNITED STATES PATENT OFFICE.

ALFRED BOX, OF PHILADELPHIA, PENNSYLVANIA.

IMPROVEMENT IN RADIAL DRILLING-MACHINES.

Specification forming part of Letters Patent No. 184,060, dated November 7, 1876; application filed July 1, 1876.

*To all whom it may concern:*

Be it known that I, ALFRED BOX, of Philadelphia, in the county of Philadelphia and State of Pennsylvania, have invented a new and Improved Radial Drill, of which the following is a specification:

My invention is a contrivance of the devices comprising a radial drill, whereby the power is transmitted to the drill in whatever position it may occupy by a belt in the place of the bevel gears and shafting heretofore employed, making a simpler, cheaper, and less noisy machine than any now in use.

Figure 1 is a side elevation of my improved drill, with a part of the base sectioned. Fig. 2 is an elevation with the radial arm sectioned on the line $x\ x$ of Fig. 1. Fig. 3 is a horizontal section on the line $y\ y$, Fig. 1.

Similar letters of reference indicate corresponding parts.

A represents the column for supporting the radial arm B, which turns about and moves up and down on the column as usual in such machines, but the spindle D is geared by the belt E going in and out of the arm at I around the pulleys F G H, and around the column on the idle pulley J and driving-pulley K. The pulleys J and K are mounted in the rod L in the center of the column, and turning with the arms B, by means of the rack M and the cap N, which are connected to the rod, but are fitted so as to turn on it. The pulley K is connected to the driving-shaft O by a universal joint, Q, allowing it to turn with the rod L. The object of so turning the pulleys J and K is to have them turn with the radial arm at all times. The rack M extends down from the cap N through the radial arm B, so that it will be turned by the arm when it swings around. The radial arm is swiveled at P, to allow it to be turned on its axis for inclining the drill to right or left.

Having thus described my invention, I claim as new and desire to secure by Letters Patent—

1. The combination of driving-pulley K and the idler-pulley J, arranged on the oscillating rod L, and pulley K, geared with the driving-shaft O by a universal joint, substantially as specified.

2. The rod L, cap N, and toothed rack M, combined and arranged with the column A and the radial arm B, substantially as specified.

ALFRED BOX.

Witnesses:
HARRY MORRIS,
J. W. PICKERING.